United States Patent
Roberts

(12) 
(10) Patent No.: US 6,553,726 B1
(45) Date of Patent: Apr. 29, 2003

(54) BARRIER AGAINST CRAWLING ARTHROPODS

(75) Inventor: Ernest H. Roberts, Elyria, OH (US)

(73) Assignee: University of Florida, Gainesville, FL (US)

(*) Notice: Subject to any disclaimer, the term of this patent is extended or adjusted under 35 U.S.C. 154(b) by 0 days.

(21) Appl. No.: 09/579,251

(22) Filed: May 25, 2000

Related U.S. Application Data

(60) Provisional application No. 60/140,049, filed on Jun. 18, 1999.

(51) Int. Cl.[7] ............................................. A01G 13/10
(52) U.S. Cl. ........................................ 52/101; 47/32.5
(58) Field of Search .................... 52/101, 170, 517; 47/23, 24, 32.5, 32.4; 43/108

(56) References Cited

U.S. PATENT DOCUMENTS

| | | | |
|---|---|---|---|
| 223,321 A | | 1/1880 | Denton |
| 519,811 A | | 8/1894 | Gerard |
| 730,575 A | * | 6/1903 | Schirra ........................ 47/24 |
| 1,068,258 A | | 7/1913 | McCombs |
| 1,242,680 A | | 10/1917 | Goedeke |
| 1,248,283 A | | 11/1917 | Derck et al. |
| 1,251,786 A | | 1/1918 | Kirfman |
| 1,305,553 A | | 6/1919 | Kruse |
| 1,325,316 A | | 12/1919 | Diss |
| 1,581,410 A | | 7/1926 | Welsh |
| 1,745,905 A | | 2/1930 | Oakman |
| 1,800,613 A | | 5/1931 | Farrell |
| 1,814,471 A | | 7/1931 | Grove |
| 2,143,043 A | | 1/1939 | Wexler |
| 2,356,022 A | | 8/1944 | Wright |
| 2,389,870 A | | 11/1945 | Reevely |
| 2,535,209 A | | 12/1950 | Hubert |
| 2,593,781 A | | 4/1952 | Meis |
| 2,746,201 A | * | 5/1956 | Warrell ........................ 43/108 |
| 3,333,361 A | | 8/1967 | Manak |
| 3,705,938 A | | 12/1972 | Hyman et al. |
| 3,857,934 A | | 12/1974 | Bernstein et al. |
| 3,864,468 A | | 2/1975 | Hyman et al. |
| 4,400,909 A | | 8/1983 | Reese |
| 4,766,695 A | | 8/1988 | Harlow |
| 4,871,541 A | | 10/1989 | Shibanai |
| 4,877,617 A | | 10/1989 | Namikoshi et al. |
| 4,890,416 A | | 1/1990 | Roberts ........................ 43/131 |
| 4,908,980 A | | 3/1990 | Sherman ...................... 43/121.1 |
| 4,921,702 A | | 5/1990 | Banks et al. |
| 4,921,703 A | | 5/1990 | Higuchi et al. |
| 5,088,233 A | | 2/1992 | Frankenbery |
| 5,104,659 A | | 4/1992 | Fishbein et al. |
| 5,142,817 A | | 9/1992 | Rolf |
| 5,148,626 A | | 9/1992 | Haake, Sr. ...................... 43/121 |

(List continued on next page.)

FOREIGN PATENT DOCUMENTS

| | | | |
|---|---|---|---|
| DE | 4321511 | | 3/1994 |
| DE | 19831952 A1 | | 6/1999 |
| FR | 2638058 | | 4/1990 |
| GB | 372563 | | 5/1931 |
| GB | 472883 | | 4/1937 |
| JP | 3-10632 | * | 1/1991 ................. 47/24 |
| WO | WO 0000015 | | 1/2000 |

*Primary Examiner*—Michael Safavi
(74) *Attorney, Agent, or Firm*—Brian S. Steinberger; Brian S. Steinberger, P.A.

(57) ABSTRACT

A barrier against arthropods crawling along a surface comprises a soft pliable polymer collar portion adapted for tight and substantially continuous receipt against a surface. A mounting portion secures the collar to the surface and serves to preventing relative motion between the collar and the surface. A generally continuous flared skirt member extends from the collar and is comprised of a soft pliable polymer having a arthropod-deterring ingredient molded therein. The skirt defines an unobstructed access opening opposite the collar. The opening is defined by an end of the generally continuous skirt.

36 Claims, 4 Drawing Sheets

U.S. PATENT DOCUMENTS

| | | |
|---|---|---|
| 5,159,778 A | 11/1992 | Metzner et al. |
| 5,184,265 A | 2/1993 | Boettcher et al. |
| 5,224,288 A | 7/1993 | Skelton et al. |
| 5,274,950 A | 1/1994 | Roberts ........................ 43/121 |
| 5,414,954 A | 5/1995 | Long ............................ 43/121 |
| 5,440,833 A | 8/1995 | Stoll ............................ 43/109 |
| 5,596,834 A | 1/1997 | Ritter |
| 5,641,499 A | 6/1997 | Bencsite |
| 5,661,925 A | 9/1997 | MacMaster |
| 5,809,689 A | 9/1998 | Mathur |
| 5,819,468 A | 10/1998 | Jollie |
| 5,881,671 A | 3/1999 | Riedl ........................... 119/16 |
| 5,918,411 A | 7/1999 | Hadrava |
| 5,943,815 A | 8/1999 | Paganessi et al. |
| 6,024,048 A | 2/2000 | Potente |
| 6,230,435 B1 | 5/2001 | Carman |

* cited by examiner

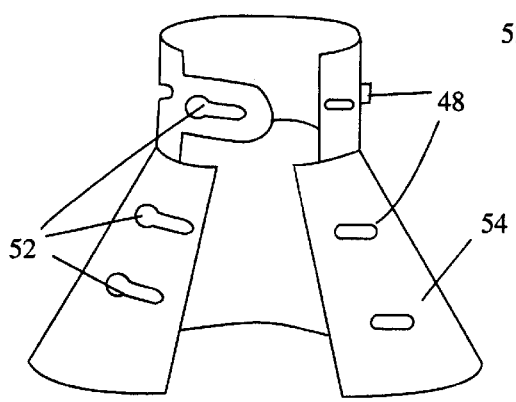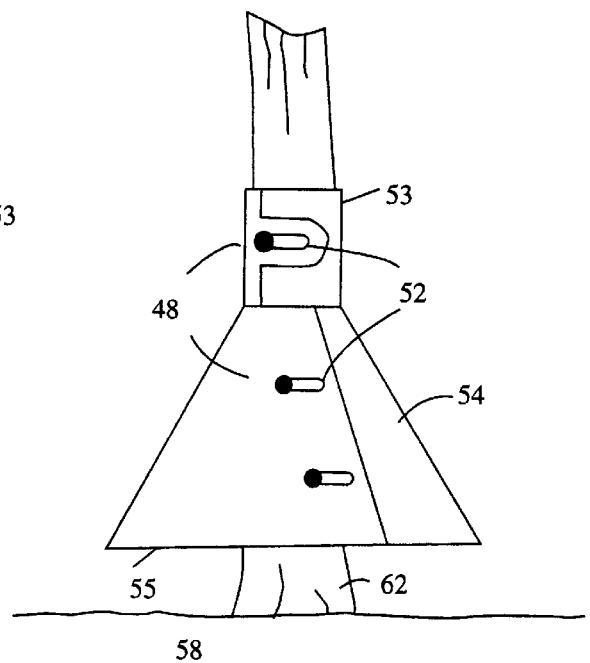
Figure 4
Figure 5

BARRIER AGAINST CRAWLING ARTHROPODS

This application claims priority from U.S. Provisional Application Serial No. 60/140,049, filed Jun. 18, 1999.

BACKGROUND OF THE INVENTION

The present invention is directed to pest management and more particularly to controlling a route of travel of crawling vermin, particularly crawling arthropods (including crawling insects) by interrupting their route of travel. The present invention provides an ecological approach to controlling crawling arthropods. It promotes environmentally-sound methods that employ point source (e.g., point of entry) physical and biological controls versus sole reliance on the atomizing, spraying and broadcasting of chemicals to keep crawling pest populations at tolerable levels. The U.S. Government has mandated a 50% reduction in the use of sprayed and broadcasted chemicals by the year 2000.

Crawling insect arthropods can cause serious damage in the agricultural industry as well as in non-agricultural environments. Further, crawling vermin can bite and/or cause the spread of disease among humans and animals. It is important to devise a device and method for impeding their route of travel.

For example, the infestation of crawling insect vermin can cause severe economic loss in citrus and other fruit and nut trees, nursery stock and ornamentals. The red imported fire ants (RIFA) in particular are responsible for damage and death of young citrus trees in the major U.S. citrus growing regions. RIFA feed on bark and cambium to obtain sap, girdling and often killing trees. Fire ants and other ants also tend a number of homopteran insects which can act as vectors for plant diseases. They will also frequently attack beneficial biocontrol organisms that prey on these homopteran insects. Fire ants have been known to frequent citrus groves, destroying young citrus trees and delaying production of fruit on those trees. With regard to more mature or fruit bearing citrus, RIFA typically build mounds at the base of these trees. Although their girdling activities do not kill the tree, they can cause "top die-back" resulting in a 15 to 20 percent yield loss. Fire ants feeding on blossoms, leaves and fruits have caused up to 90 percent yield loss in some areas. Fire ants are aggressive and inflict a painful sting, creating a hazard for persons working on the trees in the immediate area. In addition, RIFA are known to clog irrigation microjets. They also spread diseases to various citrus trees and fruits.

Prior methods for controlling RIFA and other crawling vermin include Reese Wraps which are insulating treewraps that contain a slow release packet of Diazinon. This method protects the young tree by killing any insect that comes into contact with it. However, the expense of this method is often prohibitive; therefore, Reese Wraps are not widely used.

The most prevalent method currently used for large-scale control of RIFA mounds in producing citrus groves in Florida and Texas is the EPA-registered pesticide Lorsban. This organophosphate insecticide kills exposed foraging ants on contact. Lorsban is dispersed by providing a uniform coverage throughout the grove. Although the various methods for applying Lorsban have reduced the foraging ant activity, the broadcasting method is contrary to federal mandates to reduce overall proliferation of pesticides in the environment. Random application of chemicals via spraying and broadcasting methods infiltrate the groundwater and provide other undesirable effects.

Another product, Logic, is registered for RIFA control on non-bearing citrus trees. Like Lorsban, Logic is applied by the broadcasting method. This product is an insect growth regulator, acting primarily on the ant queen. The method is very expensive.

In addition to RIFA and other types of ants, other crawling insects produce problems in groves. These include, but are not limited, to eastern Lubber grasshopper, Asian cockroaches, Gypsy Moths and others, including scales, pests, spider mites, aphids, ants, thrips and cutworms.

Many of the prior art techniques for addressing crawling arthropods are not only expensive but the products must be readdressed and reapplied quite frequently. There is a need in the industry for developing a means or device for interrupting a route of travel of crawling insect arthropods and other crawling pests at point source or point of entry that is simple to use, uncomplicated, long lasting and relatively inexpensive. It is further desirable that such device be able to control crawling vermin on a steady, non-haphazard basis.

SUMMARY OF THE INVENTION

In accordance with the present invention there is provided a novel barrier against arthropods or other vermin crawling along a surface.

In accordance with a more limited aspect of the invention, a device for interrupting a route of travel of crawling arthropods is comprised of a soft pliable polymer, or other acceptable pliable material, collar portion adapted for receipt about a surface. A mounting portion secures the collar portion to the surface and prevents relative motion between the collar and the surface. A substantially continuous flared skirt portion extends from the collar portion and comprises a soft pliable polymer, or other acceptable pliable material, having an arthropod-deterring ingredient molded therein. Alternatively, the arthropod deterring ingredient can be applied to a surface of the skirt portion or to a removable disk or cartridge adapted for insertion beneath the skirt portion. The skirt defines an unobstructed access opening opposite the collar. The opening is defined by an end of the substantially continuous skirt.

In accordance with another aspect of the invention, a soft pliable polymer (or other soft, pliable or rigid material) band has a arthropod-deterring ingredient molded therein. The band is adapted for tight and substantially continuous receipt about a surface. A mounting portion secures the band to the surface and prevents relative motion between the band and the surface. The band is fixed in place by a fastener.

In accordance with yet another aspect of the invention, a device for protecting a botanical axis from crawling arthropods comprises a soft pliable collar portion adapted for receipt about the botanical axis. A flared skirt portion extends from the collar. The skirt portion is comprised of a soft pliable material having an arthropod-deterring ingredient disposed or molded therein. An unobstructed access opening is defined by an end of the flared skirt opposite the collar.

In accordance with still another aspect of the invention, there is provided a method for interrupting a route of travel of crawling arthropods along a slender object. A soft pliable polymer is provided, with a flared skirt extending therefrom. An arthropod-deterring ingredient is molded in the skirt. The collar is wrapped about an outer perimeter of the slender object and fastened into place. An open end of the skirt is directed toward the source of the crawling arthropods. A vapor head, which creates a deterring atmosphere, is produced within the space defined by the skirt and deters and interrupts the crawling arthropods' route of travel.

A principal advantage of the invention is that only a minimum amount of the arthropod-deterring ingredient, which is preferably impregnated into (or in the alternative applied to) an expandable soft polymeric material from which at least the skirt portion is molded, is required.

Another advantage of the invention is the ability for the protective barrier against insects to conform to the outer configuration of a given surface. The device can be molded and shaped for various preferred sizes and virtually any shape—round, square, rectangular, angular, or a combination of shapes.

Yet another advantage of the invention resides in the ability of the device to stretch when applied to a structure to make the fit secure and snug and to firmly hold the device in place. The stretchability also allows for stretchability during growth of a botanical axis.

Another advantage of the invention resides in the ability of ends of the collar portion to overlap to allow for fit adjustment and growth of an underlying botanical axis.

Yet another advantage of the invention resides in the device's durability and usefulness in all weather conditions without dissipation of the active material. The active ingredient dissipates on a slow release basis regardless of the weather.

Yet another advantage of the present invention is its ability to deter crawling insects and impede their route of travel. The device is non-directional and can be applied to any surface in any direction (e.g. upward, downward, horizontally, diagonally). Furthermore, it is portable can be moved from structure to structure, place to place without destroying or interrupting the effect of the active ingredient.

The barrier of the present invention is long lasting, and provides an economical alternative to prior art methods for controlling crawling insect arthropod in specific areas at pont source (not flying insects). The device can be applied in the agricultural area for use on a variety of botanical axes such as on trees, limbs, branches, and other growing plants and shrubs. It can also be used to prevent arthropods from crawling into homes, onto shelving, boats, and virtually along any surface which provides a route of travel for crawling pests. The barrier is designed so that humans face minimal contact with the arthropod-deterring ingredient, be it a pesticide, insecticide, repellant, or natural substance. Preferably, the arthropod-deterring material is safe if humans come into contact with it. Is also safe for use in agriculture. A cover or vinyl shield can be employed.

Still other advantages and benefits of the invention will become apparent to those skilled in the art upon reading and understanding of the following detailed description.

BRIEF DESCRIPTION OF THE DRAWINGS

The invention may take physical form in certain parts and arrangements of parts, a preferred embodiment which will be described in detail in the specification and illustrated in the accompanying drawings which form a part hereof.

FIG. 4 displays an alternative embodiment of a crawling arthropod barrier configured for receipt around the surface of a structure, the barrier shown in its opened position;

FIG. 5 shows the barrier of FIG. 4 in its closed position;

DETAILED DESCRIPTION OF THE PREFERRED EMBODIMENTS

Figure 1:
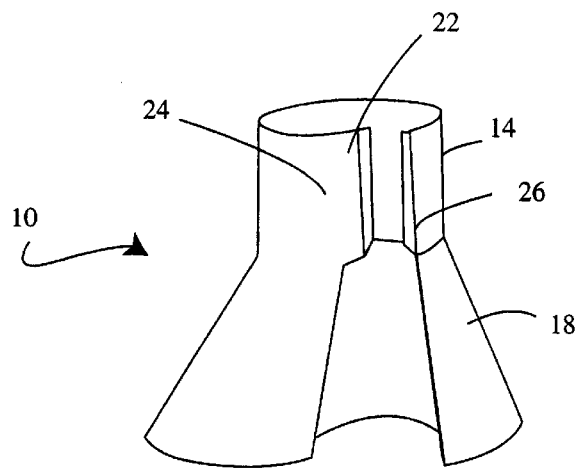
FIG. 1 shows a crawling arthropod-deterring device in its relaxed, open position prior to installation about an elongated structure.

Referring now to the drawings wherein the showings are for purposes of illustrating the preferred embodiment of the invention only and not for purposes of limiting same, the FIGURES show a barrier against arthropods crawling along a surface.

Directing attention first to FIG. 1, a device 10 for interrupting a route of travel of crawling arthropods is shown. The device comprises a collar portion 14 and a flared skirt or trumpet portion 18. A mounting portion 22 extends from a first end 24 of the collar portion. The mounting portion is adapted to overlap with a second end 26 of the collar portion when the device is installed over an elongated object. It is, however, within the scope of the invention for the mounting portion to simply abut with the second end of the collar portion, or to be situated closely proximate the second end. The skirt portion 18 is preferably molded integrally with the collar portion. It is fully within the scope of this invention, however, that the skirt portion can be manufactured separately from the collar portion from the same or different materials.

Preferably, the collar portion and skirt portion are comprised of a soft, pliable polymer having a crawling arthropod-deterring ingredient molded therein. However, any suitable pliable material can be used.

The soft-pliable polymer, preferably a soft polyvinyl material, is desirable for its pliability. Other acceptable polymeric materials can be used as well. The soft polymer can conform to the shape of the underlying structure which it is protecting, be it a tree, branch, or other botanical axis, a table leg, a cable conduit, or even a flat or irregular surface when the barrier is conformed in such a configuration. An insecticide, pesticide, repellant or other arthropod-deterring ingredient is molded directly in the polyvinyl material to provide a constant time release emission of vapor from the ingredient. The level of pesticide, insecticide, repellant or other arthropod-deterring ingredient contained in the polymer is sufficiently low and there is no more than minimal contact with human skin such as during installation, removal, adjustments, or the like. However, there is sufficient amount of insecticide within the material to cause an instantaneous repelling or even destruction of the crawling vermin with which it comes in contact. Furthermore, a vapor head produced by the active material is significant enough to deter or repel many crawling arthropods.

As will be more fully discussed below, the barrier can include a plastic outer layer or cover to eliminate contact of the active material with humans. The plastic outer layer or shell would possibly be preferred by homeowners, while professional or commercial users may be less inclined to opt for the shield. Under some circumstances, users can opt for a barrier that does not have the outer cover. The cover can be rigid or pliable, but does not contain any active ingredients (no pesticides or other arthropod repellants).

The barrier provides for a point-source (point of entry) protective barrier in the form of a polyvinyl collar or shield which is impregnated with a synthetic or natural pyrethroid, pesticide or repellant. One example of a pesticide that can be used is the slow-release synthetic pesticide known as permethrin. This is the preferred embodiment. The pesticides or repellants useful in the barrier are in no way limited to permethrin. Permethrin is useful in this application because of its long history of demonstrated safety in pest management. Other useful pyrethroids, pesticides, insecticides, or other active arthropod deterring ingredients can be used.

The barrier is made to be adjustable and effective for a long duration. This enables a single collar/skirt barrier to be used for a substantial amount of time precluding the need to remove, reinstall and/or replace the device on a seasonal basis. The barrier is adjustable to allow for trunk growth in the event it is used on trees. If the barrier is properly placed near the base of a tree or shrub, it completely excludes crawling insects at point-source. The active ingredient affects only the target insect coming into contact with the guard. Furthermore, because the insecticide (e.g., permethrin) is impregnated in the soft polyvinyl embodiment of the device, there is a minimal exposure of the pesticide to the soil, tree or shrub, beneficial insects, and the persons handling the device.

Figure 2:
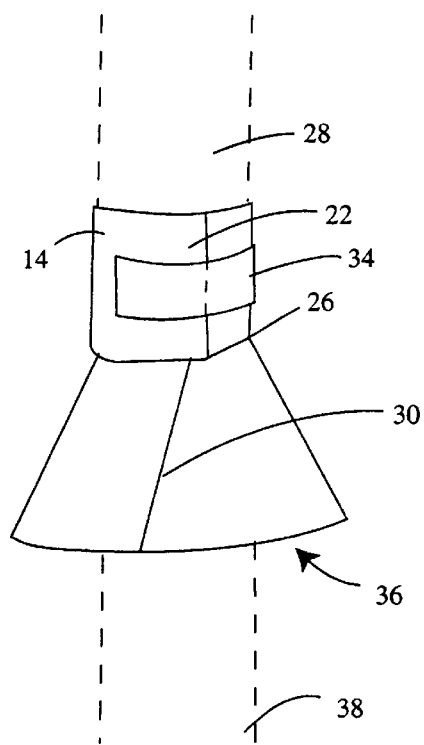
FIG. 2 depicts the arthropod-deterring device of FIG. 1 in its installed position about a structure.

The collar portion of the device fits tightly around an elongated structure 28 as shown in FIG. 2. The underlying structure need not be specifically elongated as it can be short, squat, or flat. The device is designed to fit about an outer perimeter of a structure, regardless of the perimeter's shape, size, or axial or radial irregularity. The underlying structure can be a tree, leg, pole, pillar, botanical axis, rope, shaft, or virtually any slender object where arthropods crawl. In the case of a surface or tree, the device is generally installed along the base of the tree or other structure, preferably one to two inches above the ground level. This is evident in FIG. 2. Of course, it can be placed anywhere along the length of the underlying structure.

With attention still focused on FIG. 2, it will be noted that the mounting portion 22 has overlapped with a second end 26 of the collar portion 14. It is within the scope of the invention that the mounting portion simply abut or be closely proximate the second end of the collar portion. The skirt portion has likewise become substantially continuous, although in some instances it is foreseeable that the skirt will be slightly split at the seam segment 30. A fastener element fixes the collar securely to the structure 28. The fastener may comprise hook and loop type fasteners which may be mounted on the underside of the mounting portion and on the second end of the collar. Other fasteners may include snaps or buttons. Preferably, a fastener may include a clamp, such as a spring or C-clamp shown at 34 in FIG. 2. The C-clamp with spring action closes tightly around the collar portion after it has been wrapped about the structure 28. It is also foreseeable to use a plastic tie band, or even wire or other fastening or adhering device for holding the barrier in place.

As stated, an arthropod-deterring ingredient is preferably molded into the soft polyvinyl material from which the barrier is molded. It is also foreseeable that the arthropod-deterring ingredient is layered on the underside of the skirt or otherwise inserted via a cartridge or similar appliance beneath the skirt. Forseeably, the active ingredient can be molded in a disk that is inserted beneath the skirt. In any event, the active or arthropod-deterring ingredient develops a vapor head within the space 36 defined by the skirt interior to deter crawling arthropods from continuing on their route of travel. The open end of the skirt is opposite the collar and directed toward a point source 38 from which arthropods crawl. As the arthropods reach the barrier device, the vapor head developed by the active ingredient kills, repels, or otherwise deters the crawling arthropod from continuing along its path.

Figure 3:
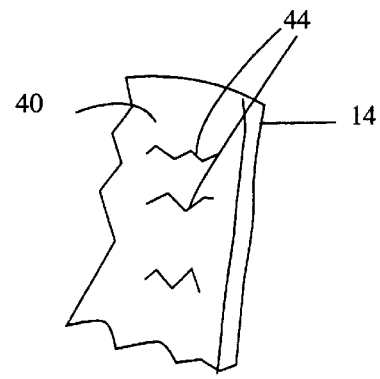
FIG. 3 set forth a broken away segment of a collar portion of a barrier of FIG. 1 showing notches or grooves on an inner surface thereof.

FIG. 3 shows a portion of the collar portion broken away to show the interior wall 40 thereof. As will be noted, notches or ridges 44 are molded into the underside of the collar to produce a friction fit between the underlying structure 28 (see FIG. 2) and the collar. The notches are not necessary but do provide additional secure fit of the device on the elongated structure.

FIGS. 4 and 5 show alternative embodiment of the present invention. As will be noted, the collar and skirt portion can be varied from the open position (FIG. 4) to the closed position (FIG. 5) by employing various known or state of the art fasteners such as, by way of example, button closures 48 which fit in through mating openings 52 situated opposite therefrom. Several buttons and openings are shown to accommodate for size of the underlying surface. Virtually any other means for closing the collar and skirt 54 upon itself can be used, including clasps, hook and loop type fasteners (Velcro®), snaps, adhesives, zippers, tape, staples, or any other means useful for adhering or joining the two ends together. An end 55 of the skirt which opposes the collar 53 defines an access opening into the bell region defined by the skirt. Insects or other vermin which crawl along the ground 58 and up a surface of a tree 62 will be repelled or possibly even killed by a vapor head which arises within the region defined by the skirt.

Figures 6, 7:
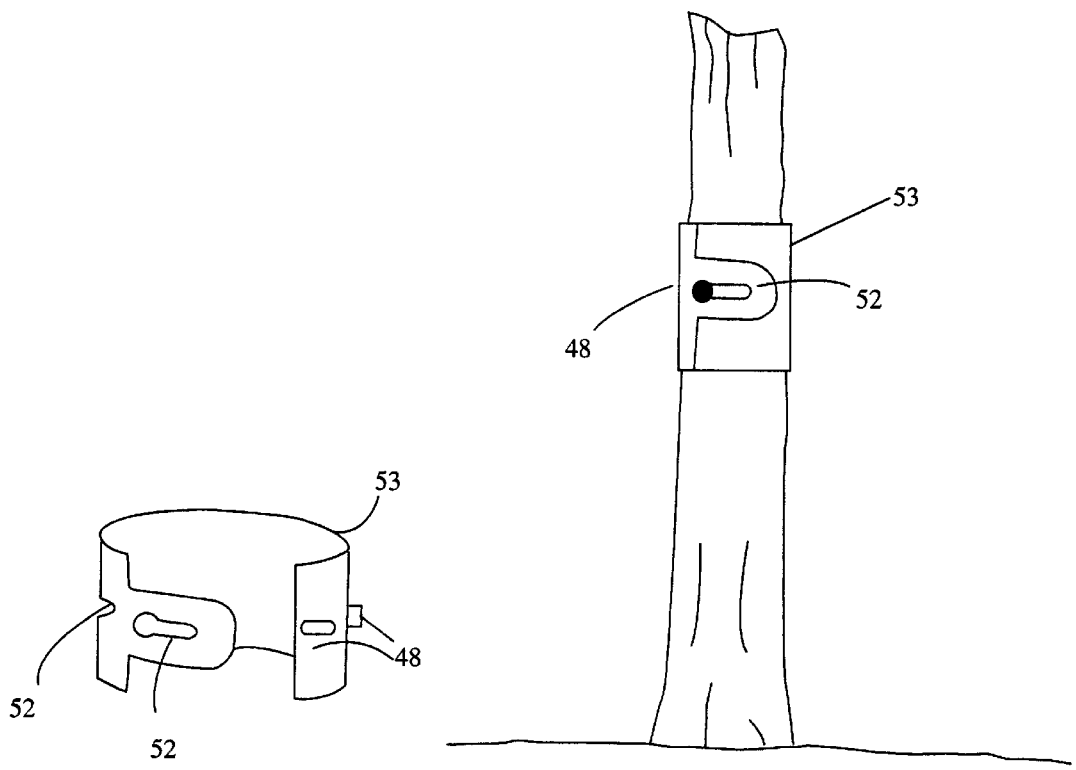
FIG. 6 discloses a barrier band in its opened position.
FIG. 7 shows the barrier band of FIG. 6 in its closed position about a tree surface.

Turning now to FIG. 6, an other alternative embodiment barrier is shown. FIG. 7 shows the barrier of FIG. 6 in closed position about a tree trunk. Like the barrier shown in FIG. 4, the barrier of FIGS. 6 and 7 can be fastened using fasteners such as, for example, buttons 48 designed for joining with opposing holes 52. The multiple buttons and holes allow for an adjustable fit about the base of a trunk as the tree grows. A similar type of collar or shield can be employed on a variety of other structures including table legs, conduit, boat cable, etc., or any structure that could act as a path for crawling insects. As crawling vermin insects crawl along a given structure (shown in FIG. 7 as a tree), they must come into contact with the band, shield or collar 53. The band, shield or collar 53 is comprised of a soft polymeric material, preferably a polyvinyl material, having an insecticide impregnated therein. As the crawling pest comes into contact with the collar, the insecticide either repels or even kills the crawling arthropod, thereby interrupting the route of travel of the crawling arthropod.

Figure 8:
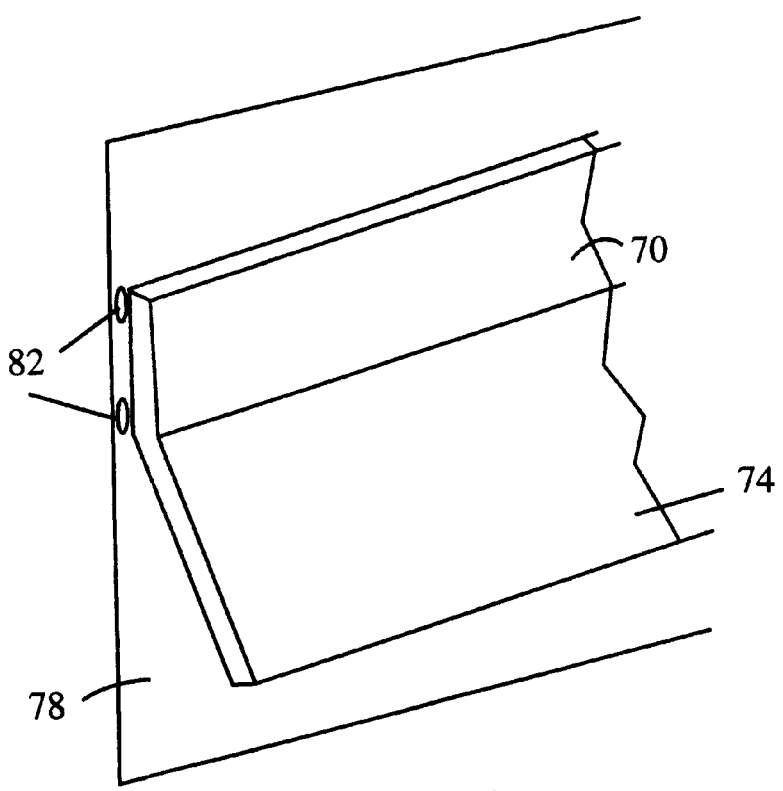
FIG. 8 is directed to an alternative embodiment arthropod barrier adapted for receipt along any surface.
Figure 9:
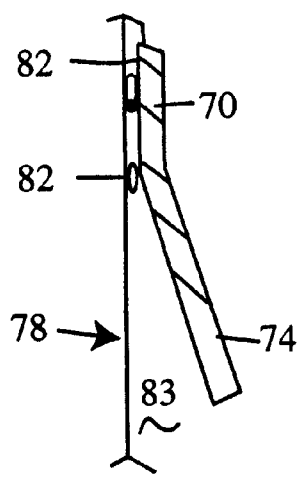
FIG. 9 is a side view of the arthropod barrier of FIG. 8.

With attention at FIGS. 8 and 9, another alternative embodiment of a barrier for interrupting a route of travel of arthropod is disclosed. The barrier comprises a collar portion 70 and skirt portion 74. Both the collar and skirt are comprised of a soft polymeric or other pliable material with an insecticide impregnated therein during the molding operation. It is fully foreseeable that only the skirt portion be impregnated with the insecticide. The active ingredient can also be inserted on a surface of the skirt or via a removable cartridge. The barrier of FIGS. 8 and 9 is continuous and can be trimmed to provide a continuous fit along any surface along which arthropod crawl. FIGS. 8 and 9 show by way of example the barrier to be fixed or attached to a flat surface or wall 78 using a fastening device 82 for means of attaching one surface to another. Of course it is fully within the scope of the present invention that the collar portion can be fixed to the surface by any practicable means including nails, staples, glue, tape, hooks, or any other fastener or adhering method known to those skilled in the art for joining two physical elements. The material from which the barrier is made is pliable. Therefore, the barrier can conform to an irregular shaped surface and can travel around corners or be trimmed to fit a particular configuration. A vapor barrier is present in the space 83 between the wall or surface 78 and the skirt 84. A pest crawling into this opening between the skirt and wall would encounter a vapor head barrier caused by the insecticide which would either kill or repel the pest downward and thereby impede its route of travel along the wall 78. Even if debris and dust accumulate on the skirt of FIGS. 8 and 9, or even on the skirt of FIGS. 1–5, the internal surface of the skirt remains clean and the pesticide or pest-repelling ingredient molded in the barrier remains active.

It is fully foreseeable that a strip of molded material with an insecticide molded therein be affixed to a surface without the need of a skirt. For example, a skirt may not be needed in closed or enclosed environments. In such an instance, a arthropod crawling upward along a surface would be killed or repelled based on the insecticide in the polyvinyl material which comprises the strip.

The barrier of the present invention, in its various embodiments, may be used in residential or commercial applications, indoors or outdoors. It is useful in kitchen environments, hospitals, in tree groves, and virtually anywhere that crawling insects or arthropods need to be stopped or deterred.

Figure 10:
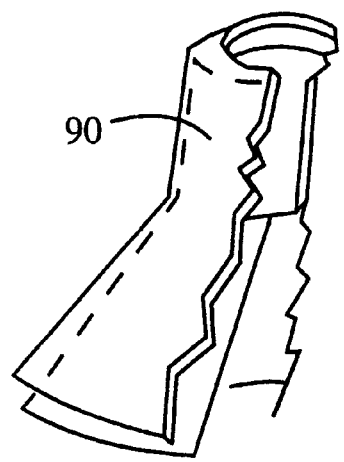
FIG. 10 is a portion of a barrier device showing a cover, broken away in part.

Any of the above-described barrier embodiments, or those contemplated by this invention, may include a cover 90. This is shown by way of example in FIG. 10. The cover is made of an inert material such as vinyl or other plastic. There is no pesticide impregnated in the cover, although it is possible that natural pest deterring ingredients safe for human handling (e.g. such as cayenne pepper or even petroleum jelly) could be included in or on the cover. The cover can conform to the outer shape of the barrier, or it may be spaced from the barrier, such as by way of example, in the form of an awning or umbrella over the barrier. Preferably, the barrier is form fit to the cover, but it could be mounted with fasteners or adhesives or other means. The cover serves to reduce or eliminate human contact with the active barrier material. It also acts as a protection against weather and debris. The cover, or a cover in an alternative configuration, could be used on any of the embodiments described herein or on embodiments contemplated by this invention. With regard to those embodiments that disclose a skirt, the barrier would preferably extend below the lip of the cover such that it is exposed in certain situations.

The invention has been described with reference to the preferred embodiment. Obviously modifications and alterations will occur to others upon a reading and understanding of this specification. It is intended to include all such modifications and alterations in so far as they come within the scope of the appended claims or the equivalent thereof.

I claim:

1. A device for interrupting a route of travel of crawling arthropods, comprising:
   a soft pliable collar portion adapted for receipt about a surface;
   a mounting portion for securing the collar portion to the surface and for preventing relative motion between the collar and the surface; and
   a substantially continuous flared skirt portion extending from the collar portion and comprised of a soft pliable single layer material formed from a soft polymeric material and including an arthropod-deterring ingredient molded into the polymeric material, the skirt defining an unobstructed access opening opposite the collar, said opening defined by an end of a substantially continuous skirt.

2. The device of claim 1 wherein the soft pliable polymer from which the collar and skirt are molded is a polyvinyl material.

3. The device of claim 2 wherein a slow release synthetic pyrethroid is molded in the polyvinyl material.

4. The device of claim 3 wherein the slow release synthetic pyrethroid is permethrin or other arthropod deterring ingredient.

5. The device of claim 1 further including a fastener for securing the collar against the surface of the elongated structure received axially therethrough.

6. The device of claim 1 further including a fastener for securing the collar against the surface of an elongated structure received axially therethrough.

7. The device of claim 1 wherein the polymer collar is adapted for continuous receipt about the surface.

8. The device of claim 1 wherein the flared skirt extends from an end of the collar portion.

9. The device of claim 1 wherein the collar is integral with the flared skirt.

10. The device of claim 1 wherein the collar portion includes an arthropod-deterring ingredient molded into a single layer polymer material.

11. A barrier against arthropods crawling along a surface, the barrier comprising:
    a soft pliable single layer band formed from a polymeric material having an arthropod-deterring ingredient molded into the polymeric material, the band adapted for tight and substantially continuous receipt about the surface;
    a mounting portion for securing the band to the surface and for preventing relative motion between the band and the surface;
    a fastener for fixing the band to the surface; and
    a generally continuous flared pre-shaped molded skirt member extending from the band and comprised of a soft pliable single layer polymeric material having an arthropod-deterring ingredient molded into the polymeric material, the skirt defining an unobstructed access opening opposite the band, said opening defined by an end of the generally continuous skirt.

12. The barrier of claim 11 wherein a vapor head is created in an area defined by the skirt for impeding a route of travel of the crawling arthropod.

13. The barrier of claim 11 wherein the arthropod-deterring ingredient is a slow release synthetic pyrethoid.

14. The barrier of claim 13 wherein the slow release synthetic pyrethoid is permethrin.

15. A device for interrupting a route of travel of crawling arthropods, comprising:
    a soft pliable collar adapted for receipt along a surface;
    a mounting portion for securing the collar portion to the surface and preventing relative motion between the collar and the surface; and
    a substantially continuous flared skirt portion formed from a single layer polymer material extending from the collar portion and an arthropod-deterring ingredient molded into the skirt portion, the skirt defining an unobstructed access opening opposite the collar defined by an end of the substantially continuous skirt.

16. The device of claim 15 wherein the skirt portion is comprised of a pliable pre-shape molded material.

17. A device for protecting a botanical axis from crawling arthropods, comprising:

a soft pliable single layer polymer collar portion adapted for receipt about a botanical axis; and a flared skirt portion extending from the collar and comprised of a soft pliable single layer polymer having an arthropod-deterring ingredient molded into the polymer, the skirt defining an unobstructed access opening opposite the collar, said opening defined by an end of the flared skirt.

18. The device of claim 17, further comprising a mounting portion for securing the collar to the surface of the botanical axis and for preventing relative motion between the device and the botanical axis.

19. The device of claim 18 further including a fastener for securing the collar portion about the surface of the botanical axis.

20. The device of claim 17 wherein the collar and skirt portions are molded from a polyvinyl material in which is molded a slow release synthetic pyrethoid.

21. The device of claim 20 wherein the slow release synthetic pyrethoid is permethrin.

22. The device of claim 17 wherein a vapor head is in an area defined by the skirt to deter the crawling arthropods.

23. The device of claim 17 wherein the polymer collar is adapted to provide a substantially continuous receipt about the botanical axis.

24. The device of claim 17 wherein the polymer collar is comprised of a flexible polymer expandable to allow for botanical axis growth.

25. The device of claim 17 wherein the flared skirt is substantially continuous about the surface.

26. The device of claim 17 wherein the flared skirt extends from an end of the collar portion.

27. The device of claim 17 wherein the collar is integral with the flared skirt.

28. The device of claim 17 wherein the collar portion includes an arthropod-deterring ingredient molded therein.

29. A method for interrupting a route of travel of crawling arthropods along a slender object comprising the steps of:

providing a collar;

extending a flared skirt formed from a soft pliable single layer polymer from the collar, the skirt including an arthropod-deterring ingredient molded into the polymer;

wrapping the collar having first and second ends about an outer perimeter of the slender object;

fastening the collar in place;

directing an open end of the skirt toward a source of crawling arthropods;

producing a vapor head within a space defined by the skirt; and interrupting the route of travel of crawling arthropods along the slender object.

30. The method claim 29, wherein the slender object comprises a botanical axis.

31. The method of claim 29, including the additional step of varying an inner periphery of the collar commensurate with an ambit of the slender object.

32. The method of claim 31, comprising the step of stretching the polymer to varying the inner periphery.

33. The method of claim 31, wherein the inner periphery is varied by molding.

34. The method claim 29, including the additional step of contacting a first end of the collar with a second end of the collar to securely fix the collar to the slender object.

35. The method of claim 31 wherein the inner periphery is varied by adjusting the contact of the first end of the collar with the second end of the collar.

36. A method for protecting a botanical axis from crawling arthropods, comprising the steps of:

providing a soft pliable single layer polymer collar emerging in a trumpet portion, said collar and trumpet portion including an arthropod-deterring component molded into the trumpet portion;

positioning the collar about an outer perimeter of the botanical axis to form a continuous collar and at least a substantially continuous trumpet portion;

directing an open end of the trumpet portion toward a source of crawling arthropods;

producing a vapor head within a space defined by the trumpet portion; and interrupting a route of travel of the crawling arthropods along the botanical axis.

* * * * *